US012341686B2

(12) United States Patent
Kundu et al.

(10) Patent No.: US 12,341,686 B2
(45) Date of Patent: Jun. 24, 2025

(54) SYSTEM AND METHOD FOR FACILITATING EFFICIENT UTILIZATION OF AN OUTPUT BUFFER IN A NETWORK INTERFACE CONTROLLER (NIC)

(71) Applicant: Hewlett Packard Enterprise Development LP, Spring, TX (US)

(72) Inventors: Partha Pratim Kundu, Palo Alto, CA (US); David Charles Hewson, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/429,840

(22) Filed: Feb. 1, 2024

(65) Prior Publication Data

US 2024/0171507 A1 May 23, 2024

Related U.S. Application Data

(63) Continuation of application No. 17/594,624, filed as application No. PCT/US2020/024242 on Mar. 23, 2020, now Pat. No. 11,916,781.

(Continued)

(51) Int. Cl.
*H04L 45/28* (2022.01)
*G06F 9/50* (2006.01)
(Continued)

(52) U.S. Cl.
CPC .............. *H04L 45/28* (2013.01); *G06F 9/505* (2013.01); *G06F 9/546* (2013.01); *G06F 12/0862* (2013.01); *G06F 12/1036* (2013.01);
*G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/28* (2013.01); *G06F 13/385* (2013.01); *G06F 13/4022* (2013.01); *G06F 13/4068* (2013.01);
(Continued)

(58) Field of Classification Search
None
See application file for complete search history.

(56) References Cited

U.S. PATENT DOCUMENTS

2009/0216964 A1* 8/2009 Palladino ................ G06F 13/28
711/E12.001
2010/0169501 A1* 7/2010 King ........................ H04L 9/40
709/230

(Continued)

*Primary Examiner* — Steve R Young
(74) *Attorney, Agent, or Firm* — Yao Legal Services, Inc.

(57) ABSTRACT

A network interface controller (NIC) capable of efficiently utilizing an output buffer is provided. The NIC can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry in a data structure, the virtual index, and a set of physical indices of cells storing the packet.

20 Claims, 8 Drawing Sheets

Related U.S. Application Data (60) Provisional application No. 62/852,203, filed on May 23, 2019, provisional application No. 62/852,289, filed on May 23, 2019, provisional application No. 62/852,273, filed on May 23, 2019.

(51) Int. Cl.

| | | |
|---|---|---|
| G06F 9/54 | (2006.01) | |
| G06F 12/0862 | (2016.01) | |
| G06F 12/1036 | (2016.01) | |
| G06F 12/1045 | (2016.01) | |
| G06F 13/14 | (2006.01) | |
| G06F 13/16 | (2006.01) | |
| G06F 13/28 | (2006.01) | |
| G06F 13/38 | (2006.01) | |
| G06F 13/40 | (2006.01) | |
| G06F 13/42 | (2006.01) | |
| G06F 15/173 | (2006.01) | |
| H04L 1/00 | (2006.01) | |
| H04L 43/0876 | (2022.01) | |
| H04L 43/10 | (2022.01) | |
| H04L 45/00 | (2022.01) | |
| H04L 45/02 | (2022.01) | |
| H04L 45/021 | (2022.01) | |
| H04L 45/028 | (2022.01) | |
| H04L 45/12 | (2022.01) | |
| H04L 45/122 | (2022.01) | |
| H04L 45/125 | (2022.01) | |
| H04L 45/16 | (2022.01) | |
| H04L 45/24 | (2022.01) | |
| H04L 45/42 | (2022.01) | |
| H04L 45/745 | (2022.01) | |
| H04L 45/7453 | (2022.01) | |
| H04L 47/10 | (2022.01) | |
| H04L 47/11 | (2022.01) | |
| H04L 47/12 | (2022.01) | |
| H04L 47/122 | (2022.01) | |
| H04L 47/20 | (2022.01) | |
| H04L 47/22 | (2022.01) | |
| H04L 47/24 | (2022.01) | |
| H04L 47/2441 | (2022.01) | |
| H04L 47/2466 | (2022.01) | |
| H04L 47/2483 | (2022.01) | |
| H04L 47/30 | (2022.01) | |
| H04L 47/32 | (2022.01) | |
| H04L 47/34 | (2022.01) | |
| H04L 47/52 | (2022.01) | |
| H04L 47/62 | (2022.01) | |
| H04L 47/625 | (2022.01) | |
| H04L 47/6275 | (2022.01) | |
| H04L 47/629 | (2022.01) | |
| H04L 47/76 | (2022.01) | |
| H04L 47/762 | (2022.01) | |
| H04L 47/78 | (2022.01) | |
| H04L 47/80 | (2022.01) | |
| H04L 49/00 | (2022.01) | |
| H04L 49/101 | (2022.01) | |
| H04L 49/15 | (2022.01) | |
| H04L 49/90 | (2022.01) | |
| H04L 49/9005 | (2022.01) | |
| H04L 49/9047 | (2022.01) | |
| H04L 67/1097 | (2022.01) | |
| H04L 69/22 | (2022.01) | |
| H04L 69/40 | (2022.01) | |
| H04L 69/28 | (2022.01) | |

(52) U.S. Cl.
CPC .... *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(56) References Cited

U.S. PATENT DOCUMENTS

2017/0153852 A1* 6/2017 Ma .................. G06F 3/0656
2018/0092113 A1* 3/2018 Negoto ............ H04W 28/065

* cited by examiner

SYSTEM AND METHOD FOR
FACILITATING EFFICIENT UTILIZATION
OF AN OUTPUT BUFFER IN A NETWORK
INTERFACE CONTROLLER (NIC)

CROSS REFERENCE TO RELATED
APPLICATIONS

This application is a continuation of U.S. patent application Ser. No. 17/594,624, filed on Oct. 25, 2021, which application is a national stage of International Application No. PCT/US2020/024242, filed on Mar. 23, 2020, which claims the benefit of U.S. Provisional Application No. 62/852,203 filed on May 23, 2019. U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

BACKGROUND

Field

This is generally related to the technical field of networking. More specifically, this disclosure is related to systems and methods for facilitating efficient utilization of an output buffer in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficiently utilizing an output buffer is provided. The NIC can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry in a data structure, the virtual index, and a set of physical indices of cells storing the packet.

BRIEF DESCRIPTION OF THE FIGURES

In the figures, like reference numerals refer to the same figure elements.

DETAILED DESCRIPTION

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

OVERVIEW

The present disclosure describes systems and methods that facilitate efficient utilization of an output buffer in a network interface controller (NIC). The NIC allows a host to communicate with a data-driven network. The network can accommodate dynamic data traffic with fast, effective congestion control by maintaining state information of individual packet streams.

The embodiments described herein solve the problem of efficiently allocating packets from a plurality of injectors to a shared output buffer of a NIC by (i) representing a multi-cell packet as a virtual packet index, and (ii) storing the packet in a plurality of cells of the output buffer and representing the indices of the cells based on the virtual packet index. An injector can be any element of the NIC that may inject traffic into the buffer.

During operation, the NIC may receive a command from a host device of the NIC. A host interface of the NIC may couple the NIC with the host device and facilitate the communication between the host device and the NIC. The command can be an immediate data command (IDC) or a direct memory access (DMA) command. A command that carries the data associated with the command can be an IDC. On the other hand, a command with one or more pointers to the relevant data is referred to as a DMA command (DMAC) (e.g., a "GET" or a "PUT" command of remote DMA (RDMA)). Furthermore, the traffic generated based on the commands can be assigned to different classes, such as traffic shaping classes or buffer classes. Each buffer class may be associated with one or more injectors. On the other hand, an injector may be allocated to one buffer class. Consequently, for the same buffer class, multiple injectors may send packets in parallel.

However, the injectors may share a common output buffer. To facilitate efficient data access, the output buffer can support both sequential and random access to the stored data. As a result, the NIC can insert the packets generated by a command into the buffer at any available location without requiring it to be contiguous. This allows the buffer to store packets while avoiding fragmentation of available capacity in the buffer. The buffer can be organized as cells, which can be memory locations in a memory device (e.g., a static random-access memory (SRAM) module). A respective cell can have a fixed size (e.g., 256 bytes). An injector may insert traffic into the buffer at a granularity of the cell size.

Typically, a cell-based buffer can be implemented based on a linked-list so that multi-cell packets can be accessed from the buffer. However, such an implementation may not provide an efficient way to access the buffer at random locations.

To solve this problem, the NIC can represent a multi-cell packet based on a virtual packet index (VPI). Since a multi-cell packet can be stored across multiple cells, a VPI for the packet can be associated with a set of pointers. A respective pointer can correspond to a physical cell in the buffer that may store a portion of the packet (e.g., a packet segment). Such a pointer can be referred to as a physical cell index (PCI). To access a portion of the packet, the NIC can use the VPI and an offset associated with the VPI. The offset can indicate a PCI that may store that portion of the packet. On the other hand, if a packet can fit in a single cell, the NIC can use the PCI instead of the VPI to represent the packet in the buffer.

The NIC can maintain a translation table that can store a respective VPI and a set of PCIs associated with the VPI. Each VPI can indicate an entry in the translation table. Each entry can include a number of slots, each indicated by an offset. Each PCI is associated with the VPI can be stored in a slot and can be retrieved based on the offset associated with the VPI. For example, if the packet is distributed across 3 cells, the slot corresponding to the initial offset (i.e., the zero offset) can include a PCI to the first (or head) cell storing the packet. The first offset can indicate the next slot that can store the PCI of the second cell. Similarly, the second offset can indicate the subsequent slot that can store the PCI of the third cell. Hence, to represent such a packet, the entry may need at least three slots. However, different packets can have different lengths and may require different numbers of cells. As a result, if each entry in the translation table can include a number of slots such that the entry can accommodate a packet of a maximum length, some entries may have unused slots.

To reduce the number of pointers in the translation table, the NIC can facilitate a number of packet groups. Each of the packet groups can represent a distinct maximum packet size (e.g., 1 kilobyte (KB), 3 KB, and 10 KB). The translation table can include a set of entries for each packet group. If the size of a cell is 256 bytes and the length of a packet is 1 KB, each entry of the corresponding packet group can include 4 slots. Therefore, the offset value of such an entry can be 4. Similarly, each entry of the packet group of 3 KB packets can include 12 slots, and the corresponding offset value can be 12. Since each entry of the translation table can be represented by a VPI and an offset, the same translation table can have entries with different numbers of slots.

Based on the maximum packet size for a packet group, the NIC may determine the number of VPIs required for that packet group. For example, a packet group of 3 KB packet size can store packets that are between 1025 and 3072 bytes. If the size of a cell is 256 bytes and the number cells in the output buffer is 1024, a packet of the packet group may need at last 5 cells. Therefore, the maximum number of VPIs needed for that packet group can be 1024/5=204. The packet group sizes can then be determined to optimize the utilization of the hardware resources of the NIC. This mechanism allows the NIC to utilize the output buffer, in its entirety, for storing packets irrespective of the size of each packet. This mechanism can avoid fragmentation in the output buffer, and provide both sequential and random access to a respective packet in the output buffer. In some embodiments, an injector can be a message chopping unit (MCU) module, which can fragment a message into packets of sizes corresponding to a maximum transmission unit (MTU).

One embodiment of the present invention provides a NIC that can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry in a data structure, the virtual index and a set of physical indices of cells storing the packet.

In a variation on this embodiment, the entry can be identified by the virtual index and include a set of slots. Each slot may store a physical index of the set of physical indices.

In a variation on this embodiment, the injector logic block can generate a packet segment based on a size of a cell and store the packet segment in a cell identified by a physical index of the set of physical indices.

In a further variation, the allocation logic block can determine a packet group for the packet. The packet group can indicate the maximum size of a packet supported by the entry.

In a further variation, the data structure can include entries for a plurality of packet groups.

In a variation on this embodiment, the cells storing the packet are non-contiguous in the output buffer.

In a variation on this embodiment, the NIC can include a retrieval logic block that can determine a packet handle and an offset associated with the packet, identify the entry based on the packet handle, and obtain the set of physical indices from the entry.

In a further variation, the retrieval logic block can obtain a packet segment from a respective cell associated with a physical index of the set of physical indices.

In a further variation, the allocation logic block can release the entry for reallocation.

In a variation on this embodiment, if the packet is a single-cell packet, the allocation logic block can determine a physical index of a cell for the packet. The injector logic block can then store the packet in a cell identified by the physical index.

Figure 1:
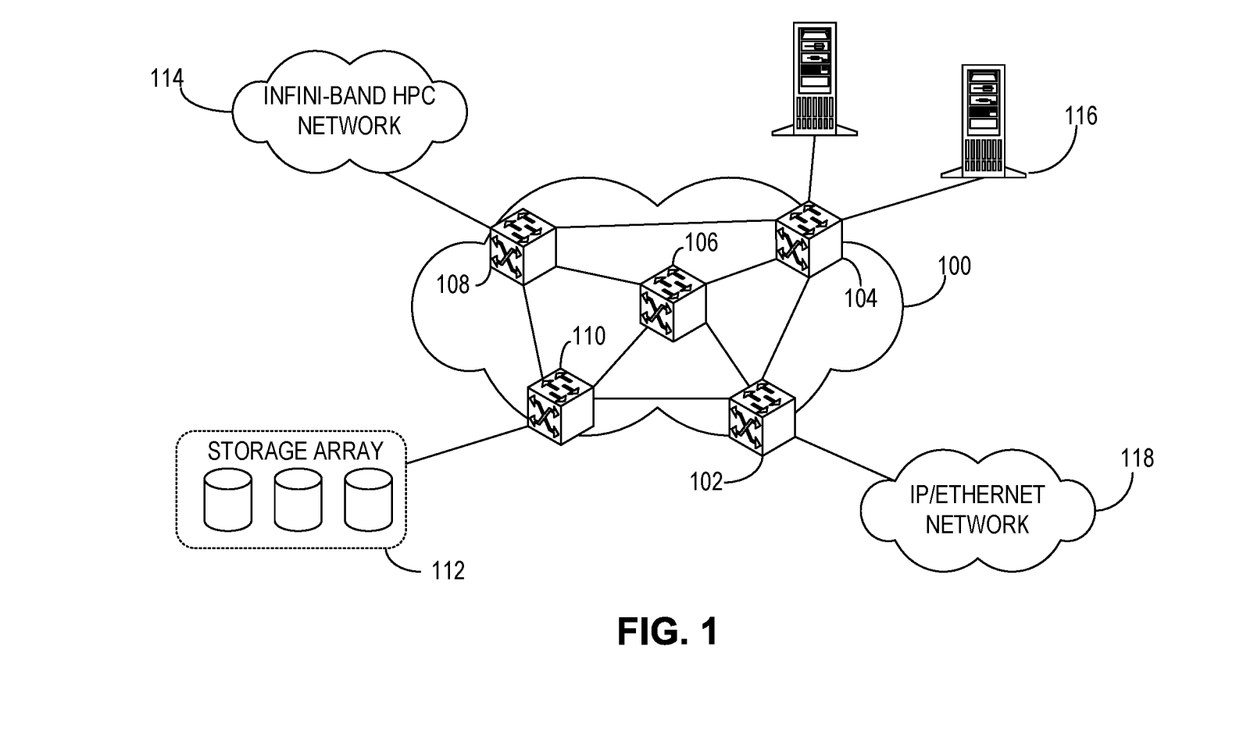
FIG. 1 shows an exemplary network.
Figure 2A:
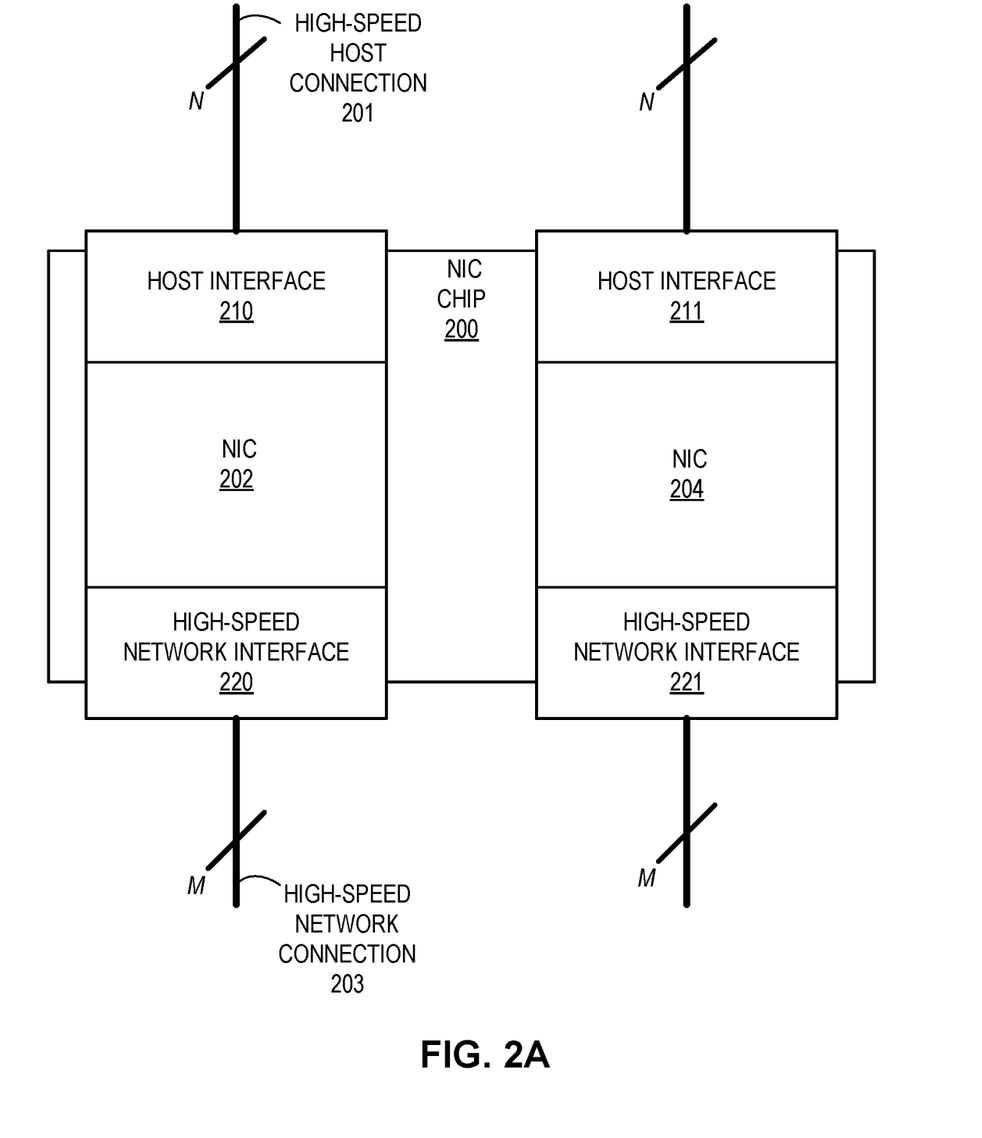
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient management of idempotent operations.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI), a peripheral component interconnect express (PCIe), or a compute express link (CXL) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
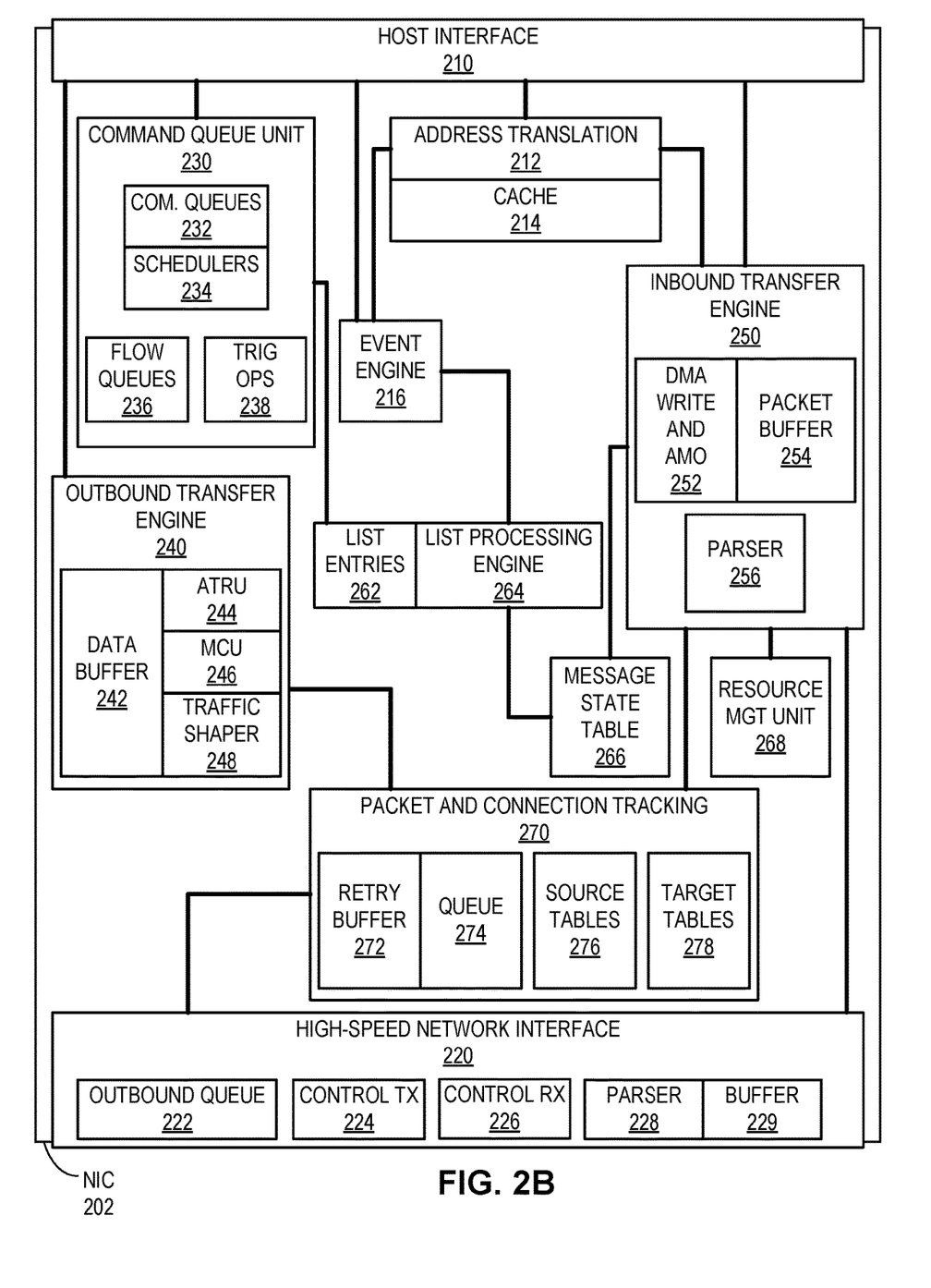
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Efficient Buffer Utilization in NIC

Figure 3A:
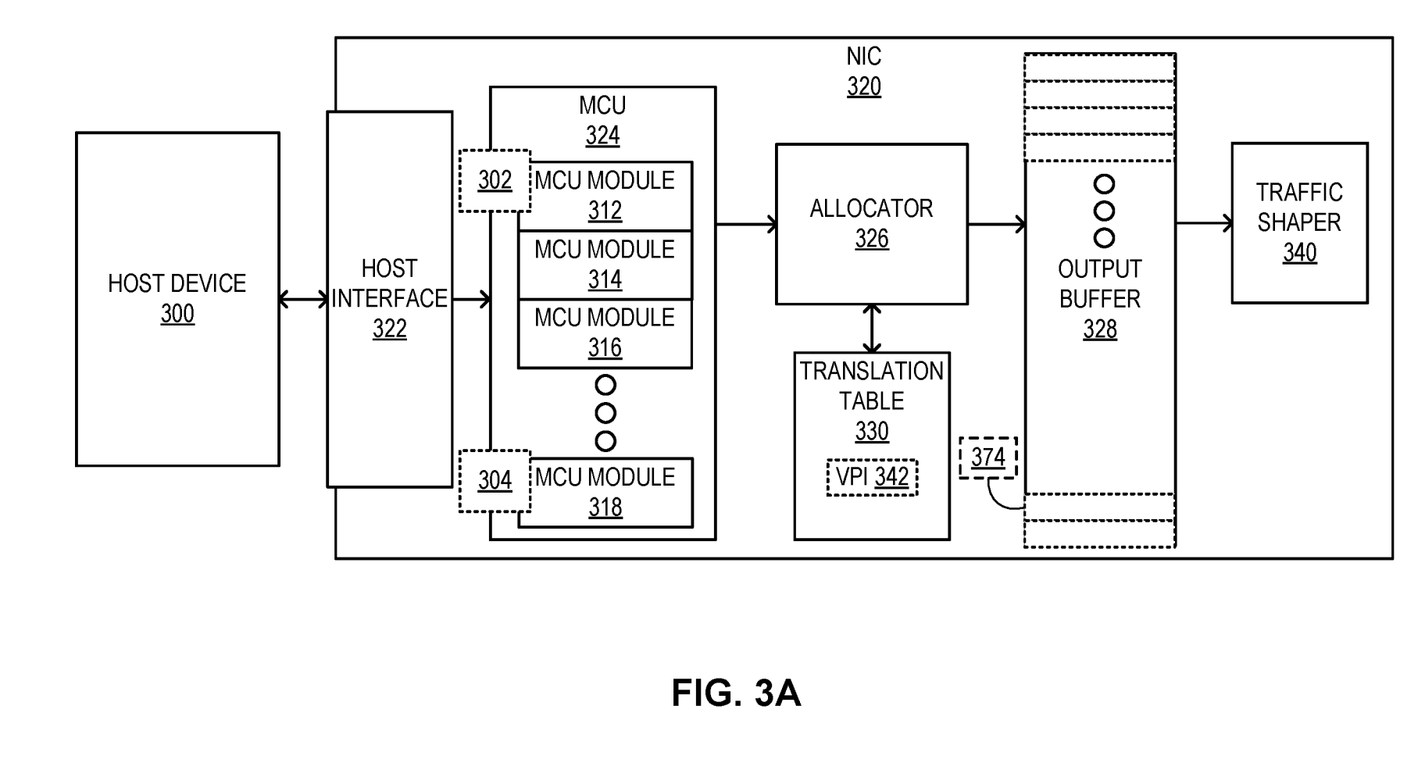
FIG. 3A shows exemplary utilization of an output buffer in a NIC.

FIG. 3A shows exemplary utilization of an output buffer in a NIC. In this example, host device 300 can include a NIC 320. A host interface 322 of NIC 320 may couple NIC 320 with device 300 and facilitate the communication between device 300 and NIC 320. NIC 320 can include an MCU 324, which can include a plurality of MCU modules 312, 314, 416, and 318. The MCU modules in MCU 324 can inject traffic into a shared output buffer 328. Therefore, the MCU modules in MCU 324 can be the injectors for buffer 328. The traffic injected by MCU 324 may belong to different buffer classes. Each buffer class may be associated with one or more MCU modules. On the other hand, an MCU module may be allocated to one buffer class. Consequently, for the same buffer class, multiple MCU modules may inject packets in parallel.

However, the MCU modules in MCU 324 can share a common output buffer 328. To facilitate efficient data access, buffer 328 can support both sequential and random access to the stored data. As a result, an allocator 326 can insert a packet generated by a command into buffer 328 at any available location without requiring it to be contiguous. This allows buffer 328 to store packets while avoiding fragmentation of available capacity in buffer 328. Buffer 328 can be organized as cells, which can be non-contiguous memory locations in a memory device, such as an SRAM module. A respective cell can have a fixed size (e.g., 256 bytes). MCU module 312 may insert a packet 302 into multiple cells of buffer 328. On the other hand, MCU module 318 may insert a packet 304 into a single cell of buffer 328. Typically, the cells of buffer 328 can be organized based on a linked-list so that multi-cell packet 302 can be accessed from buffer 328. However, such an implementation may not provide an efficient way to access buffer 328 at random locations.

To solve this problem, allocator 326 can represent packet 302 based on a VPI 342. Since packet 302 can be stored across multiple cells, VPI 342 can be associated with a set of PCIs. A respective PCI can correspond to a physical cell in buffer 328 that may store a portion of packet 302 (e.g., a packet segment). To access a portion of packet 302, NIC 320 can use VPI 342, which can include a packet handle associated with packet 302 and an offset associated with VPI 342. The packet handle can be represented by the PCI of the head cell (e.g., PCI 364 for packet 302). The offset can indicate a PCI that may store that portion of packet 302. The packet handle can be provided by MCU 312.

When traffic shaper 340 selects MCU 312 for forwarding packet 302, traffic shaper 340 can use the packet handle to determine VPI 342. On the other hand, since packet 304 can fit in a single cell, allocator 326 can use PCI 374 to represent the location of packet 304 in buffer 328. Traffic shaper 340 can use PCI 374 to obtain packet 304 from buffer 328. NIC 320 can maintain a translation table 330 that can store VPI 342 and a set of PCIs associated with VPI 342. To access packet 302 from buffer 328, a traffic shaper 340 can use the PCIs associated with VPI 342 and obtain the portions of packet 302.

Figure 3B:
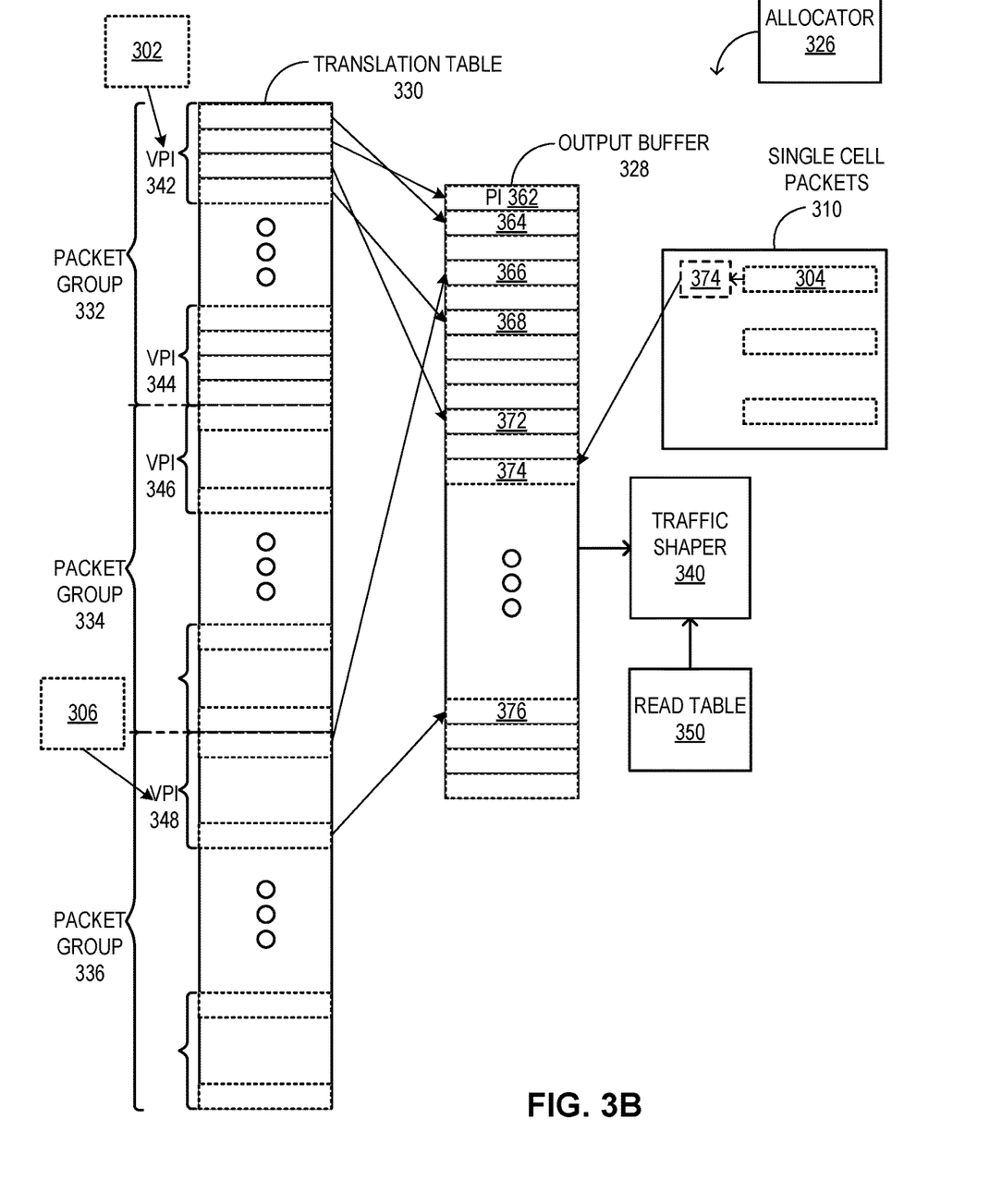
FIG. 3B shows an exemplary allocation process for efficiently utilizing an output buffer in a NIC.

FIG. 3B shows an exemplary allocation process for efficiently utilizing an output buffer in a NIC. Allocator 326 may provide a number of VPIs 342, 344, 346, and 348. Each VPI can indicate an entry in translation table 330. Each entry can include a number of slots, each indicated by an offset. For example, the entry corresponding to VPI 342 can include a number of slots for storing a set of PCIs 364, 362, 368, and 372. Each of these PCIs can identify a cell that can store a portion of packet 302. The entry can store PCIs 364, 362, 368, and 372 in this sequence because the associated cells can store the portions in the corresponding sequence. Cells associated with PCIs 364, 362, 368, and 372 can be non-contiguous. Furthermore, even though PCI 362 may represent a lower index than PCI 364, PCI 362 can store a later portion of packet 302 than PCI 364.

To retrieve packet 302 from buffer 328, traffic shaper 328 can access an entry in a read table 350 to obtain VPI 342. VPI 342 can include the packet handle (i.e., PCI 364) and the offset. Read table 350 can facilitate set of reverse pointers that can be used to allow VPI 342 to be identified by PCI 364 (i.e., the first cell used for packet 302). In some embodiments, the read table entry can be associated with MCU 312. This can allow traffic shaper 340 to retrieve information associated with packet 302 from read table 350 upon selecting MCU 312 for forwarding the next packet. Traffic shaper 340 can use PCI 364 to perform a reverse lookup and identify VPI 342. Traffic shaper 340 can then use VPI 342 to identify the corresponding entry in translation table 330. In some embodiments, the read table may store VPI 342, and traffic shaper 340 can use VPI 342 to perform a lookup and identify PCI 364.

A respective slot in the entry can be retrieved based on the offset associated with VPI 342. For example, if packet 302 is distributed across 4 cells, the slot corresponding to the initial offset (i.e., the zero offset) can include PCI 364 to the first (or head) cell. The first offset can indicate the next slot that can store PCI 362 of the second cell. Similarly, the second and third offsets can indicate the subsequent slots that can store PCIs 368 and 372 of the third and fourth cells, respectively. Hence, to represent packet 302, the entry may need at least four slots.

However, different packets can have different lengths and may require different numbers of cells. As a result, if each entry in translation table 330 can include a number of slots such that the entry can accommodate a packet of a maximum length, some entries in translation table 330 may have unused slots. To reduce the number of pointers in translation table 330, NIC 320 can facilitate a number of packet groups 332, 334, and 336. Each of the packet groups can represent a distinct maximum packet size (e.g., 1 KB, 3 KB, and 10 KB, respectively). Translation table 330 can include a set of entries for each packet group. If the size of a cell is 256 bytes and the length of a packet is 1 KB, each entry of corresponding packet group 332 can include 4 slots. Therefore, the offset value of such an entry can be 4.

Similarly, each entry of packet group 334 can include 12 slots and the corresponding offset value can be 12. Since each entry of the translation table can be represented by a VPI and an offset, the same translation table can have entries with different numbers of slots. Each packet group can have a number of entries in buffer 328. Packet group 332 can have entries associated with VPIs 342 and 344. Similarly, packet group 334 can have an entry associated with VPI 346, and packet group 334 can have an entry associated with VPI 348. When allocating packet 302 to buffer 328, allocator 326 can determine the smallest packet group (i.e., the packet group associated with the smallest packet size) that can accommodate packet 302.

Upon determining that packet 302 can be represented by packet group 332, allocator 326 can assign VPI 342 of packet group 332 to packet 302. On the other hand, upon determining that a packet 306 may need an entry associated with packet group 336, allocator 326 can select VPI 348 for packet 306. Allocator 326 may allocate a number of PCIs, such as PCIs 366 and 376, for VPI 348. Furthermore, allocator 326 can use PCI 374 to represent the location of packet 304 in buffer 328. This mechanism allows allocator 326 to allocate buffer 328, in its entirety, for storing packets because any available cell can be mapped to a VPI for a multi-cell packet or can be allocated to a single-cell packet. This mechanism can minimize fragmentation in the output buffer, and provide both sequential and random access to a respective packet in buffer 328.

Figure 4A:
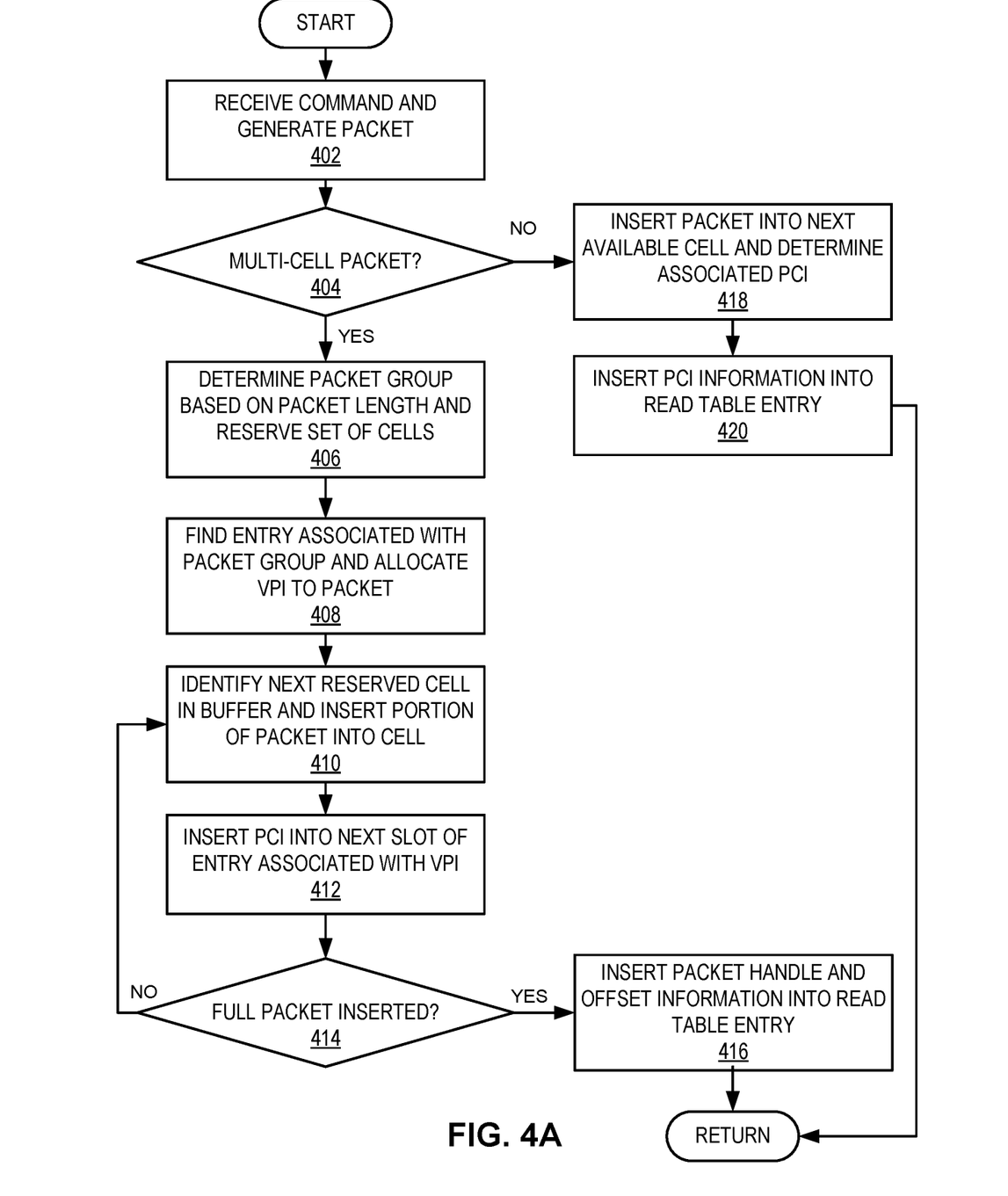
FIG. 4A shows a flow chart of an allocation process for efficiently utilizing an output buffer in a NIC.

FIG. 4A shows a flow chart of an allocation process for efficiently utilizing an output buffer in a NIC. During operation, the NIC can receive a command and generate a packet (operation 402) and check whether the packet is a multi-cell packet (operation 404). If the packet is not a multi-cell packet (i.e., a single-cell packet), the NIC can insert the packet into the next available cell of the input buffer and determine the associated PCI (operation 418). The NIC can then insert the PCI information into the read table (operation 420). On the other hand, if the packet is a multi-cell packet, the NIC can determine a packet group based on the packet length and reserve a set of cells in the output buffer based on the packet length (operation 406).

For example, the NIC may determine the packet group associated with the smallest packet size that can accommodate the packet length. The NIC can then find an entry associated with the packet and allocate the corresponding VPI to the packet (operation 408). The slots of the entry associated with the VPI can then store the PCIs of the reserved cells. Subsequently, the NIC can identify the next reserved cell in the output buffer and insert a portion of the packet into the cell (operation 410). If the size of the cell is 256 bytes and the size of the packet is 1 KB, the NIC may insert the first 256 bytes of the packet into the cell. The NIC can insert the PCI of the cell into the next slot of the entry associated with the VPI (operation 412). For the initial insertion, the next slot can be the first slot of the entry and the corresponding PCI can point to the head cell.

The NIC can then check whether the full packet has been inserted (operation 414). If the full packet has not been inserted, the NIC can continue to identify the next reserved cell in the output buffer and insert the next portion of the packet into the cell (operation 410). On the other hand, if the full packet has been inserted, the NIC can insert the packet handle and the offset information into a read table entry (operation 416). In some embodiments, the read table entry can be associated with the MCU of the packet. This can allow the traffic shaper of the NIC to retrieve the packet information from the read table upon selecting the MCU for forwarding the next packet. In some embodiments, the NIC may determine the PCI of each cell that is required and store the PCI in a corresponding slot of the entry associated with the VPI during the allocation time.

Figure 4B:
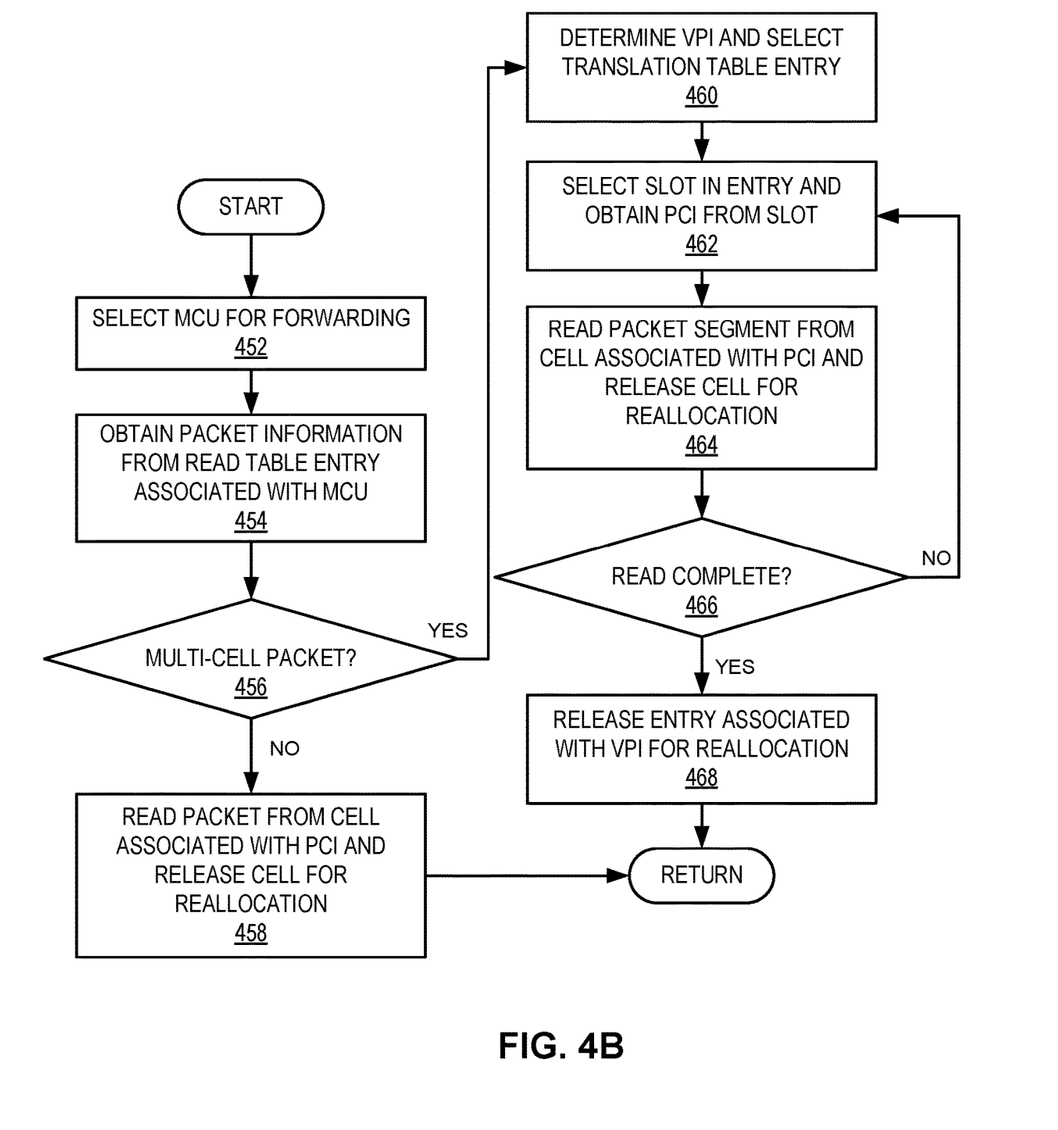
FIG. 4B shows a flow chart of a retrieval process of a multi-cell packet from an output buffer in a NIC.

FIG. 4B shows a flow chart of a retrieval process of a multi-cell packet from an output buffer in a NIC. During operation, the NIC can select an MCU for forwarding (operation 452), and obtain the packet information from a read table entry associated with the MCU (operation 454). The NIC can then determine whether the packet is a multi-cell packet (operation 456). If the packet is not a multi-cell packet, the packet information can include a PCI of the cell storing the packet. Accordingly, the NIC can read the packet from the cell associated with the PCI and release the cell for reallocation (operation 458).

On the other hand, if the packet is a multi-cell packet, the packet information can include the packet handle and offset. The NIC can then determine the VPI from the packet handle and select the corresponding translation table entry (operation 460). The NIC can then select a slot in the entry and obtain a PCI from the slot (operation 462). Subsequently, the NIC can read the packet segment from the cell associated with the PCI and release the cell for reallocation (operation 464). The NIC can then check whether the read operation is complete (operation 466). If the read is not complete, the NIC can continue to select the next slot in the entry and obtain a PCI from the slot (operation 462). If the read is complete, the NIC can release the entry associated with the VPI for reallocation (operation 468).

Exemplary Computer System

Figure 5:
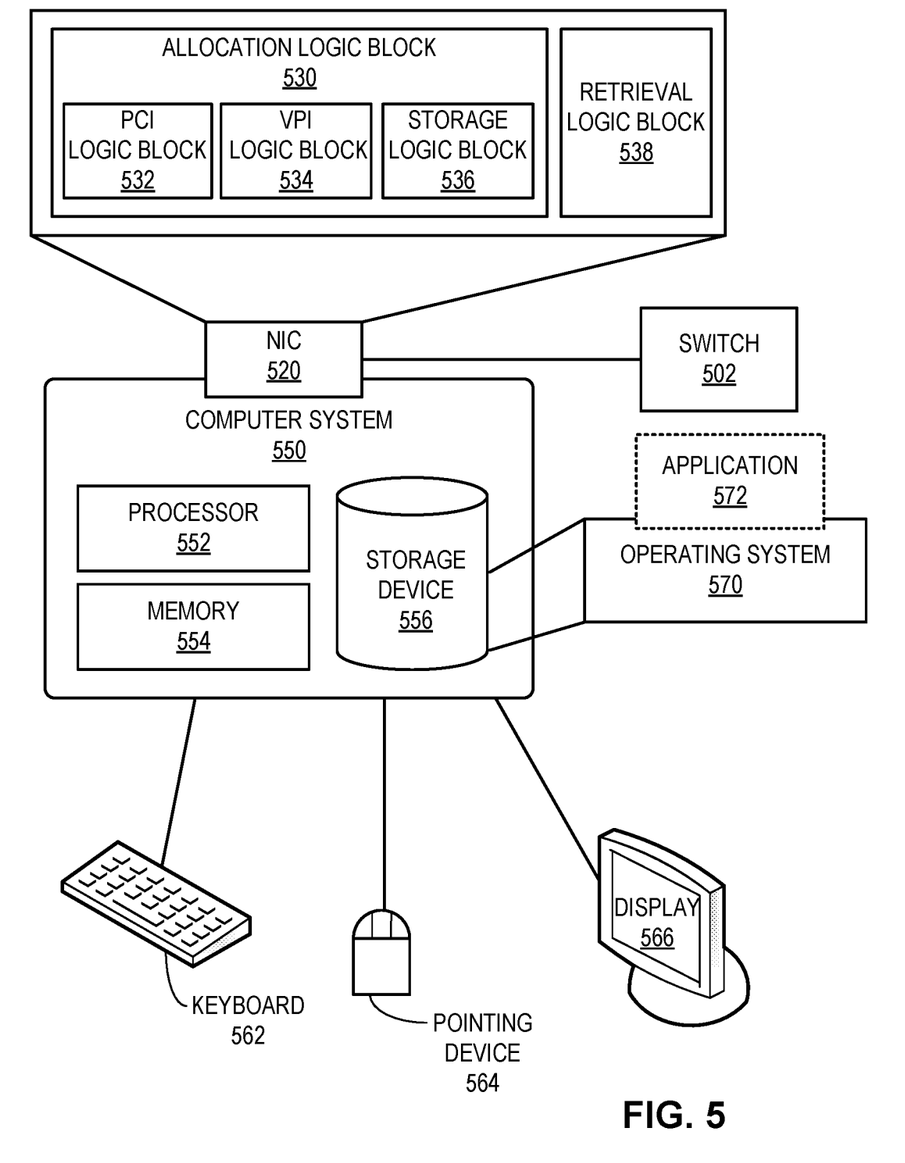
FIG. 5 shows an exemplary computer system equipped with a NIC that facilitates efficient utilization of an output buffer.

FIG. 5 shows an exemplary computer system equipped with a NIC that facilitates efficient packet forwarding. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include an allocation logic block 530, as described in conjunction with FIGS. 3A and 3B. Allocation logic block 530 can include a PCI logic block 532, a VPI logic block 534, and a storage logic block 536.

PCI logic block 532 can determine whether a packet is a multi-cell packet, and allocate a PCI to a single-cell packet. VPI logic block 534 can manage multi-cell packets in NIC 520. For example, VPI logic block 534 can select a packet group, allocate an entry in a translation table, and allocate cells for a multi-cell packet. Storage block 536 can manage the insertion of a packet into an output buffer of NIC 520, as described in conjunction with FIG. 3B. NIC 520 can also include a retrieval logic block 538 (e.g., the traffic shaper of NIC 520) that can retrieve a packet based on a read table and the translation table, as described in conjunction with FIG. 4B.

In summary, the present disclosure describes a NIC that facilitates efficient utilization of an output buffer. The NIC can be equipped with an output buffer, a host interface, an injector logic block, and an allocation logic block. The output buffer can include a plurality of cells, each of which can be a unit of storage in the output buffer. If the host interface receives a command from a host device, the injector logic block can generate a packet based on the command. The allocation logic block can then determine whether the packet is a multi-cell packet. If the packet is a multi-cell packet, the allocation logic block can determine a virtual index for the packet. The allocation logic block can then store, in an entry in a data structure, the virtual index and a set of physical indices of cells storing the packet.

The methods and processes described above can be performed by hardware logic blocks, modules, logic blocks, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for retrieving packets from an output buffer in a network interface controller (NIC), comprising:
    selecting a message-fragmenting unit for forwarding data stored in the output buffer of the NIC;
    obtaining information associated with a packet to be retrieved from the output buffer by searching, in a data structure, for an entry associated with the message-fragmenting unit;
    determining whether the packet is a multi-cell packet which is stored in more than one buffer cell; and
    in response to determining that the packet is a multi-cell packet and that the obtained packet information includes a packet handle and associated offset information:
        obtaining, from the entry, a virtual index mapped to the packet handle; and
        reading one or more segments of the packet from corresponding cells of the output buffer based on the virtual index and the associated offset information.

2. The method of claim 1, further comprising:
reading all the segments of the packet from the corresponding cells of the output buffer; and
releasing the entry in the data structure to be reallocated in response to reading all the segments.

3. The method of claim 1, further comprising:
generating the packet based on a command received from a host device;
assigning the virtual index to the packet in response to determining that the packet is a multi-cell packet;
mapping, in a translation table, the virtual index to one or more physical indices of cells in the output buffer, wherein the physical cell indices comprise the associated offset information;
inserting the packet into the cells of the output buffer based on the mapped physical cell indices; and
storing, in the entry in the data structure, a packet handle corresponding to the virtual index and the offset information associated with the virtual index.

4. The method of claim 1, further comprising:
determining that the packet is a single-cell packet and that the obtained packet information includes a first physical index of a cell in the output buffer;
reading the packet from the cell based on the first physical cell index; and
releasing the cell to be reallocated in response to reading the packet from the cell.

5. The method of claim 1, further comprising:
storing, in the entry in the data structure, an identifier of the message-fragmenting unit; and
searching for the entry associated with the selected message-fragmenting unit based on the identifier.

6. The method of claim 5, further comprising:
storing an identifier of the message-fragmenting unit in the entry for the packet based on a buffer class associated with the packet.

7. The method of claim 1, further comprising:
injecting, by the message-fragmenting units, data into the output buffer, which is shared among the message-fragmenting units.

8. The method of claim 7,
wherein the data injected by the message-fragmenting units is associated with one or more buffer classes, and
wherein a buffer class is associated with multiple message-fragmenting units, which are allowed to inject data in parallel for the associated buffer class.

9. A network interface controller (NIC), comprising:
a host interface for communicating with a host device;
an output buffer;
a plurality of message-fragmenting units for forwarding traffic stored in the output buffer;
a data structure for storing information associated with a packet; and
processing circuitry to:
    select a message-fragmenting unit;
    obtain information associated with a packet to be retrieved from the output buffer by searching, in the data structure, for an entry associated with the message-fragmenting unit;
    determine whether the packet is a multi-cell packet which is stored in more than one buffer cell; and in response to determining that the packet is a multi-cell packet and that the obtained packet information from the entry includes a packet handle and associated offset information:
  obtain a virtual index mapped to the packet handle; and
  read segments of the packet from corresponding cells of the output buffer based on the virtual index, wherein a respective segment is read from a respective cell based on the associated offset information.

10. The NIC of claim 9, the processing circuitry further to:
release the entry in the data structure for reallocation in response to reading all the segments of the packet from the corresponding cells of the output buffer.

11. The NIC of claim 9, the processing circuitry further to:
generate the packet based on a command received from the host device via the host interface;
assign the virtual index to the packet in response to determining that the packet is a multi-cell packet;
map the virtual index to one or more physical indices of cells in the output buffer, wherein the physical cell indices comprise the associated offset information;
insert the packet into the cells of the output buffer based on the mapped physical cell indices; and
store, in the entry in the data structure, a packet handle corresponding to the virtual index and the offset information associated with the virtual index.

12. The NIC of claim 9, the processing circuitry further to:
determine that the packet is a single-cell packet which is stored in a single cell of the output buffer and that the obtained packet information includes a first physical index of a cell in the output buffer;
read the packet from the cell based on the first physical cell index; and
release the cell for reallocation in response to reading the packet from the cell.

13. The NIC of claim 9, the processing circuitry further to:
store an identifier of the message-fragmenting unit in the entry for the packet based on a buffer class associated with the packet.

14. The NIC of claim 9, the processing circuitry further to:
inject, by the message-fragmenting units, data into the output buffer,
wherein the injected data is associated with one or more buffer classes, and
wherein a buffer class is associated with multiple message-fragmenting units, which are allowed to inject data in parallel for the same associated buffer class.

15. A computer system, comprising:
a processor; and
a network interface controller (NIC) comprising at least an output buffer, a plurality of message-fragmenting units for forwarding traffic stored in the output buffer, a data structure for storing information associated with a packet, and processing circuitry storing instructions to:
  select a message-fragmenting unit;
  obtain information associated with a packet to be retrieved from the output buffer by searching, in the data structure, for an entry associated with the message-fragmenting unit; and
  in response to determining that the packet is a multi-cell packet which is stored in more than one buffer cell and that the obtained packet information from the entry includes a packet handle and associated offset information:
    obtain a virtual index mapped to the packet handle; and
    read segments of the packet from corresponding cells of the output buffer based on the virtual index and the associated offset information.

16. The computer system of claim 15, the instructions further to:
release the entry in the data structure for reallocation responsive to reading the segments of the packet from the corresponding cells of the output buffer.

17. The computer system of claim 15, the instructions further to:
generate the packet based on a command received from a host device;
assign the virtual index to the packet in response to determining that the packet is a multi-cell packet;
map the virtual index to one or more physical indices of cells in the output buffer, wherein the physical cell indices comprise the associated offset information;
insert the packet into the cells of the output buffer based on the mapped physical cell indices; and
store, in the entry in the data structure, a packet handle corresponding to the virtual index and the offset information associated with the virtual index.

18. The computer system of claim 15, the instructions further to:
responsive to the packet being a single-cell packet which is stored in a single cell of the output buffer and the obtained packet information including a first physical index of a cell in the output buffer:
  read the packet from the cell based on the first physical cell index; and
  release the cell for reallocation.

19. The computer system of claim 15, the instructions further to:
store an identifier of the message-fragmenting unit in the entry for the packet based on a buffer class associated with the packet.

20. The computer system of claim 15, the instructions further to:
inject, by the message-fragmenting units, data into the output buffer,
wherein the injected data is associated with one or more buffer classes, and
wherein a buffer class is associated with a plurality of the message-fragmenting units, which are allowed to inject data in parallel for the associated buffer class.

* * * * *